Aug. 31, 1943.  E. G. FRIEDMAN  2,328,208
INDICATOR
Filed May 6, 1941
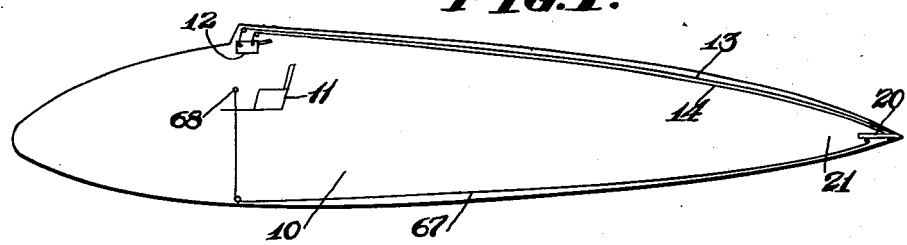
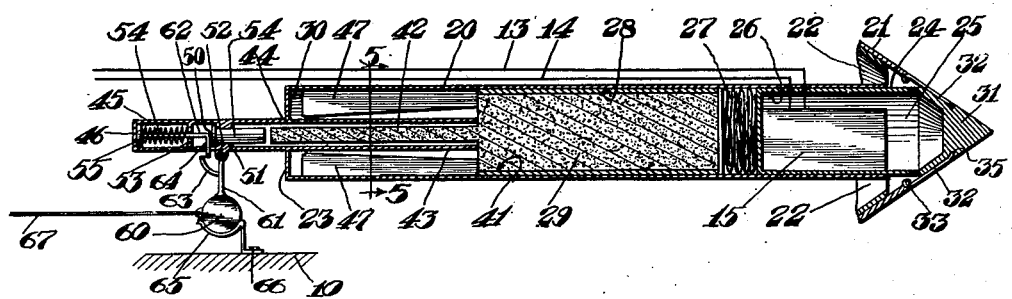
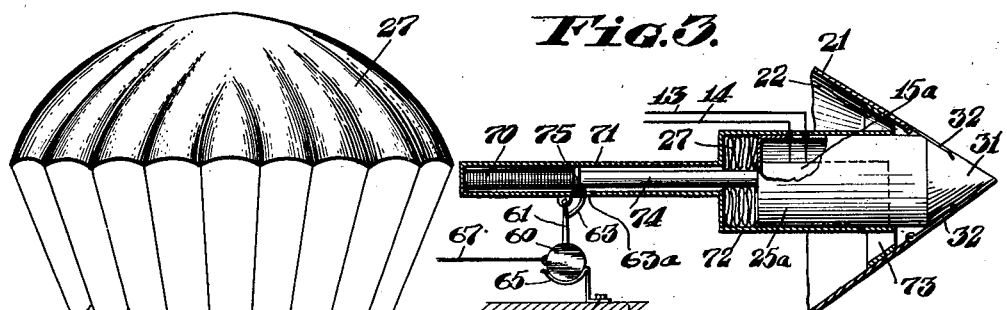
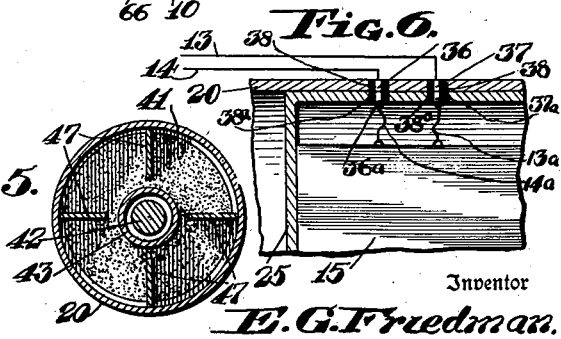
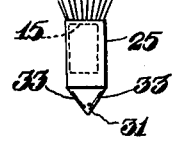
Inventor
E. G. Friedman.
By Munn, Anderson & Liddy
Attorneys Patented Aug. 31, 1943

2,328,208

UNITED STATES PATENT OFFICE 2,328,208

INDICATOR

Emery G. Friedman, Tampico, Mexico

Application May 6, 1941, Serial No. 392,158

6 Claims. (Cl. 244—1)

This invention relates to a device for recording information and indicating the location of a fallen airplane.

An object of the invention is the provision of a device carrying a recording instrument attached to a parachute which is adapted to be projected from the airplane either by the pilot of the airplane, or the same may be automatically released by a gravity controlled mechanism, the recording device being operated by the pilot for recording information before a crash occurs so that the last minute explanation of the pilot will be preserved, thereby rendering valuable information to a board of inquiry.

Another object of the invention is the provision of a device which is adapted to be expelled from an airplane which contains the recordation of the pilot's explanation as to the nature of the trouble developed in the airplane which necessitated the rapid descent, and when there is danger of a crash occurring the recorder being released automatically and discharged from the airplane at a safe distance either manually by the pilot or automatically, the discharging device also including a visible indicator for pointing out the position of the airship after the crash.

A further object of the invention is the provision of a device which is incorporated within a cylinder mounted in a convenient part of the body of an airplane which will carry an instrument for a recordation of the pilot's last minute explanation with a parachute connected with the housing of the instrument for carrying the instrument away from the airplane and for safely landing the instrument so that the information recorded by the instrument will be preserved, provision being made to seal the container housing the recording instrument against moisture in the event that the container and instrument should fall into a body of water, provision being further made for maintaining the container and instrument afloat.

This invention will be best understood from a consideration of the following detailed description, in view of the accompanying drawing forming a part of the specification, nevertheless, it is to be understood that the invention is not confined to the disclosure, being susceptible of such changes and modifications as define no material departure from the salient features of the invention as expressed in the appended claims.

In the drawing:

Figure 1 diagrammatically shows a side elevation of the fuselage of an airplane showing my invention incorporated therein.

Figure 2 is an enlarged vertical longitudinal section of a housed recording instrument, folded parachute and smoke bomb.

Figure 3 is a vertical longitudinal section of a modified form of the expulsion means for a recording instrument attached to a parachute.

Figure 4 is a view in elevation of a parachute showing the recording instrument in its descent and supported by the parachute.

Figure 5 is a transverse vertical section taken along the line 5—5 of Fig. 2.

Figure 6 is a fragmentary vertical section showing the recording instrument housed in a container or casing with an electrical connection between a microphone and the recording instrument.

Referring more particularly to the drawing, 10 designates the fuselage of an airplane showing a pilot's seat 11 and a microphone 12 connected by wires 13 and 14 with a recording instrument 15.

A cylinder 20 is mounted in the tail portion 21 of the aircraft and is secured in any approved manner as by brackets 22 at spaced points to a fixed part of the interior of the fuselage. The inner end of the cylinder is closed as shown at 23, while the outer end as shown at 24 is open to receive a housing or container 25 for the recording instrument 15. The shape of the cylinder 20 and the housing 25 may be of any well known form in cross sectional area. This cylinder is divided into three compartments, 26 for housing the container 25 and a parachute 27, an intermediate compartment 28 housing a smoke bomb 29, and an inner compartment 30 in which is housed certain elements that will be presently described.

The outer end of the container 25 for the recording instrument 15 may be conically shaped as shown at 31, or it may have any other configuration which will conform to the extreme rear end of the tail portion 21 of the fuselage. Spring arms 32 are secured at 33 to the tail portion 21 and extend outwardly, but towards each other, as shown in Figure 2 and are normally seated within grooves formed in the outer end 31 of the container 25. The outer ends of the grooves, as shown, in Fig. 2 are turned inwardly to receive the inturned ends 35 of the spring members 32 so that the container 25 and its outer end 31 will be maintained in position in the tail portion of the fuselage until the container 25 is forcibly propelled from the cylinder 20.

Referring more particularly to Fig. 6 it will be seen that the outer ends of the wires 13 and 14 are respectively connected with contacts 36 and 37 which are insulated as shown at 38 from the wall of the cylinder 20. Wires 13ᵃ and 14ᵃ respectively connect contacts 36ᵃ and 37ᵃ with the recording instrument 15. These contacts are insulated from the wall of the container 25 by insulating material 39. It will be noted from this figure that contact 36ᵃ is in engagement with the contact 36, while the contact 37 is in engagement with the contact 37ᵃ so that an electrical connection is established between the microphone 12 and the recording device 15 until the container 25 with the parachute 27 is propelled from said cylinder.

The recording device 15 is shown as located within the container 25 and this container may be sufficiently large to have an air chamber which will aid in maintaining the container afloat in the event that the container drops into a body of water. No means is shown for supporting the recording instrument 15 in a predetermined position within the container 25, but any well known form of bracket or block may be employed for the purpose.

The parachute is connected to the housing 25 of the recorder by means of cables 39 so that the conical end 31 of the housing 25 will point downwardly when the parachute has been released from the cylinder 20 in a manner to be presently explained.

The smoke bomb includes a casing 41 which has an extension 42 located in an auxiliary cylinder 43 formed axially of the cylinder 20 and connected at 44 to the closed end 23 of the cylinder 20. The auxiliary cylinder extends outwardly from the rear wall 23 as shown at 45 and is closed at 46. The cartridge 54 contains an efficient explosive material which when ignited will force the bomb 41 outwardly of the cylinder 20 and, therefore, discharge the parachute 27 and the container 25 to the atmosphere. Attached to the housing 41 of the smoke bomb 29 are vanes or blades 47 which extend rearwardly of the bomb in embracing relationship with the auxiliary cylinder 43 and are located within the chamber 30 of the cylinder 20.

A cap 50 is seated within a reduced portion 51 of an intermediate portion of the auxiliary cylinder 43 and is adapted to be struck by a hammer 62 slidably mounted in bearings 53 formed within the outer end of the auxiliary cylinder.

A spring 54 embraces the hammer 62 and is engaged at one end by a disc 55 secured to one end of the hammer which is in the form of a slidably mounted rod. The other end of the spring is in engagement with the bearing 53.

A pivotally mounted weight 60 is supported by an arm 61 which is swingably mounted upon a pivot 52 formed on the under face of the auxiliary cylinder 43. A trigger 63 is connected with the arm 61 and is adapted to strike a depending finger 64 on the rod or hammer 62 for forcing the inner end of the rod against the cap 50 of cartridge 54 for exploding the same which will in turn ignite the combustible material within the portion 42 of the smoke bomb.

The weight 60 is located normally within a spring seat 65 secured at 66 to a fixed part of the fuselage 10. A cable 67 is connected with the weight 60 and extends forwardly of the fuselage as shown in Fig. 1 and terminates in a hand grip 68 adjacent the pilot's seat 11 so that when desired the pilot may exert a pull on the cable 67 for causing the trigger 63 to force the hammer 62 against the cap 50.

A modified form is disclosed in Fig. 3 in which a coil spring 70 is located within an auxiliary cylinder 71 which is in communication with the main cylinder 72 supported by brackets 73 within the tail portion 21 of the aircraft. This spring is maintained under compression by the inner end 73 of a plunger 74 which is connected to the housing 25a that contains the recording instrument 15a.

The operation of my device is as follows: Referring more particularly to Figs. 1 and 2 it will be seen that the weighted pendulum 60 will be normally held in place by the curved spring seat 65 until said pendulum has been dislodged from its seat either by a pull on the cable 67 or by a sudden jar to the airplane. If there is danger of a crash because of some failure of a vital part of the airplane the pilot can give an explanation of the failure by talking directly into the microphone 12 adjacent the pilot seat 11 and this will be recorded in the machine 15 in the housing 25. After the explanation has been completed the pilot can pull on the cable 67 and cause the trigger 63 to snap violently against the finger 64 which will cause the hammer 62 to strike the cap of cartridge 54 and this will ignite the combustible material in the member 42. The explosion of the gases in the member 54 will force the smoke bomb 29 outwardly of the cylinder 20 thereby causing the container 25 and the parachute 27 to be discharged from the cylinder and this force is sufficient to release the spring clips 32. The weight of the container and its contents will be sufficient to exert a sudden jerk on the cords 39 of the parachute 27 and this parachute will fall gradually to the earth.

The smoke bomb will also be discharged and it will fall in the neighborhood of the descending parachute and the plane. The smoke bomb will give a visual indication of the location of the plane and will indicate to some degree the neighborhood where the instrument has been deposited by the parachute 27. Thus, it will be seen that the plane may be located very promptly by people in the neighborhood, or if the plane has crashed into a sparsely or uninhabited portion of the terrain the smoke bomb will indicate to searching parties in a plane the position of the plane after the crash.

Referring more particularly to Fig. 3, it will be seen that the coil spring 70 which is maintained under compression and which is held in place by a finger 63 operating through a slot 63a in the cylinder 71 will be released when the weight 60 is shifted from its seat 65 by either a pull on the cord 67 or by a sudden stoppage of the airplane. The spring will then force the parachute 27 which is folded between the inner end of the container 25a and the inner end of the cylinder 72 outwardly with the container 25a so that if the parachute and container are released at a sufficient elevation the parachute will open and carry the container and its instrument 15a to safety.

As has been previously stated the container is properly sealed to exclude moisture and the container may be made in such a manner that it will float on a body of water in the event that the parachute lands the container 25a on the body of water. This construction not only aids in locating the airplane after the crash, but will also preserve any records made by the pilot when he finds that trouble has developed in some vital part of the plane.

I claim:

1. In an airplane, a record preserving apparatus comprising a cylinder mounted in the tail portion of the airplane and having an open end at the end of said tail portion, a container slidably fitted in the outer end of the cylinder, a recording device in the container, a cap closing the open end of the container, means removably connecting the cap to the tail portion, power means at the inner end of the cylinder, means causing the power means to become active for forcing the container outwardly of the cylinder, and a parachute connected to the container.

2. In an airplane, a record preserving apparatus comprising a cylinder mounted in the tail portion of the airplane and having an open end at the end of said tail portion, a container slidably fitted in the outer end of the cylinder, a recording device in the container, a cap closing the open end of the container, means removably connecting the cap to the tail portion, an explosive charge at the inner end of the cylinder, a rockable means for causing the explosive charge to be ignited, and a parachute connected to the container.

3. In an airplane, a record preserving apparatus comprising a cylinder mounted in the tail portion of the airplane and having an open end at the end of said tail portion, a container slidably fitted in the outer end of the cylinder, a recording device in the container, a cap closing the open end of the container, means removably connecting the cap to the tail portion, an explosive charge at the inner end of the cylinder, a spring-pressed hammer, means acted on by the hammer for igniting the charge, a rockable means for operating the hammer, and a parachute connected to the container.

4. In an airplane, a record preserving apparatus comprising a cylinder mounted in the tail portion of the airplane and having an open end at the end of said tail portion, a container slidably fitted in the outer end of the cylinder, a recording device in the container, a cap closing the open end of the container, means removably connecting the cap to the tail portion, an explosive charge forming a smoke bomb at the inner end of the cylinder, means igniting the charge and including a reciprocating hammer, an oscillatable weight having means to cause actuation of the hammer, means removably retaining the weight normally against oscillation, and a parachute connected to the container.

5. In an airplane, a record preserving apparatus comprising a cylinder mounted in the tail portion of the airplane and having an open end at the end of said tail portion, a container slidably fitted in the outer end of the cylinder, a recording device in the container, a cap closing the open end of the container, means removably connecting the cap to the tail portion, a power device for causing the container to be projected from the cylinder, means retaining the power device inactive, manual means for releasing the retaining means, and a parachute connected to the container.

6. In an airplane, a record preserving apparatus comprising a cylinder mounted in the tail portion of the airplane and having an open end at the end of said tail portion, a container slidably fitted in the outer end of the cylinder, a recording device in the container, a cap closing the open end of the container, means removably connecting the cap to the tail portion, a power device for causing the container to be projected from the cylinder, swingable means retaining the power device inactive, means releasably holding the retaining means until a violent shock to the airplane will release the retaining means from the holding means, and a parachute connected to the container.

EMERY G. FRIEDMAN.